(12) United States Patent
Iverson

(10) Patent No.: US 12,448,780 B2
(45) Date of Patent: Oct. 21, 2025

(54) MOISTURE POROUS BUILDING FURRING STRIP

(71) Applicant: Tanager Products, Inc., Jackson, WY (US)

(72) Inventor: Brian Iverson, Ham Lake, MN (US)

( * ) Notice: Subject to any disclaimer, the term of this patent is extended or adjusted under 35 U.S.C. 154(b) by 360 days.

(21) Appl. No.: 18/185,984

(22) Filed: Mar. 17, 2023

(65) Prior Publication Data

US 2023/0304296 A1    Sep. 28, 2023

Related U.S. Application Data

(60) Provisional application No. 63/322,289, filed on Mar. 22, 2022.

(51) Int. Cl.
| | | |
|---|---|---|
| *E04B 2/00* | (2006.01) | |
| *E04F 13/08* | (2006.01) | |
| *E04F 13/18* | (2006.01) | |

(52) U.S. Cl.
CPC ...... *E04F 13/0817* (2013.01); *E04F 13/0866* (2013.01); *E04F 13/0885* (2013.01); *E04F 13/0898* (2013.01); *E04F 13/18* (2013.01)

(58) Field of Classification Search
CPC ... E04F 13/0885; E04F 13/0898; E04F 13/18; E04F 13/0803; E04F 13/0887
USPC .... 52/783.1, 783.11, 783.17, 783.19, 784.14
See application file for complete search history.

(56) References Cited

U.S. PATENT DOCUMENTS

| | | | | |
|---|---|---|---|---|
| 3,231,454 A * | 1/1966 | Williams | ............... | B65D 81/03 |
| | | | | 297/DIG. 8 |
| 3,483,070 A * | 12/1969 | Kennedy | ............. | B31D 3/0292 |
| | | | | 156/154 |
| 3,597,891 A * | 8/1971 | Martin | ................... | B62D 29/04 |
| | | | | 52/794.1 |
| 3,742,663 A * | 7/1973 | Duskin | ..................... | F16B 5/07 |
| | | | | 52/145 |
| 3,762,977 A * | 10/1973 | Langfeldt | ............... | B32B 27/12 |
| | | | | 428/68 |
| 3,819,007 A * | 6/1974 | Wirt | ......................... | E04B 1/86 |
| | | | | 428/116 |
| 3,865,679 A * | 2/1975 | Hale | ..................... | E04C 2/3405 |
| | | | | 428/116 |
| 3,876,492 A * | 4/1975 | Schott | ..................... | B32B 27/12 |
| | | | | 52/789.1 |
| 4,003,753 A * | 1/1977 | Hall | ....................... | H01M 4/762 |
| | | | | 429/231.1 |
| 4,054,477 A * | 10/1977 | Curran | ..................... | B32B 3/12 |
| | | | | 156/212 |
| 4,074,480 A * | 2/1978 | Burton | .................... | E06B 3/667 |
| | | | | 52/786.13 |
| 4,533,583 A * | 8/1985 | May | ........................ | E04B 1/78 |
| | | | | 428/116 |

(Continued)

*Primary Examiner* — Basil S Katcheves
(74) *Attorney, Agent, or Firm* — Gerald E. Helget; Taft Stettinius & Hollister LLP

(57) ABSTRACT

A rigid moisture and air porous building furring strip for building walls and certain roof structures has an elongate outer facer sheet and an elongate inner facer sheet with an outer face. An open cellular core is sealed to and between the facer sheets that is porous to both air and moisture. A soft self-sealing butyl-like adhesive layer is optionally on the outer face of the inner face sheet for attachment of the furring strip to the outside of the build and underneath exterior cladding.

5 Claims, 10 Drawing Sheets

(56) References Cited

U.S. PATENT DOCUMENTS

| | | | | |
|---|---|---|---|---|
| 4,617,217 A | * | 10/1986 | Michaud-Soret | B29D 99/0003 428/117 |
| 4,631,221 A | * | 12/1986 | Disselbeck | B32B 38/12 428/166 |
| 4,726,707 A | * | 2/1988 | Newton | E02D 29/14 52/783.17 |
| 5,156,327 A | * | 10/1992 | Takahashi | F01D 5/282 228/265 |
| 6,090,464 A | * | 7/2000 | Yoo | G09F 9/30 428/116 |
| 6,880,198 B1 | * | 4/2005 | Hazard | E04F 21/1655 15/245.1 |
| 6,939,599 B2 | * | 9/2005 | Clark | E04C 2/3405 52/789.1 |
| D533,950 S | * | 12/2006 | Givoni | D25/138 |
| 8,077,040 B2 | * | 12/2011 | Muirhead | B65D 19/0016 340/568.5 |
| D652,958 S | * | 1/2012 | Canales | D25/138 |
| 8,091,314 B2 | * | 1/2012 | Polk, Jr. | E04C 2/427 52/582.1 |
| 8,252,137 B2 | * | 8/2012 | Fleming, III | B32B 15/10 156/290 |
| 8,322,104 B2 | * | 12/2012 | Fleming, III | B32B 3/08 52/800.1 |
| 8,336,273 B2 | | 12/2012 | Enns | |
| 9,458,624 B2 | | 10/2016 | Colyn | |
| D771,841 S | * | 11/2016 | Chang | D25/138 |
| D772,437 S | * | 11/2016 | Chang | D25/138 |
| 9,579,866 B2 | * | 2/2017 | Ros | B32B 15/08 |
| 9,915,073 B1 | | 3/2018 | Hood | |
| 9,925,736 B2 | * | 3/2018 | Cox | B32B 15/00 |
| 10,363,974 B2 | * | 7/2019 | Cox | B62D 33/046 |
| 10,647,084 B2 | * | 5/2020 | Meure | B32B 27/288 |
| 10,753,141 B1 | * | 8/2020 | Quinif | E06B 3/7015 |
| 10,788,294 B2 | * | 9/2020 | Goodson | F41H 5/0478 |
| 10,837,174 B2 | * | 11/2020 | Doll | B32B 7/05 |
| 10,870,987 B1 | * | 12/2020 | Letts | C08J 9/142 |
| 10,920,422 B2 | * | 2/2021 | Zhang | B23K 37/003 |
| D941,501 S | * | 1/2022 | Gunderson | D25/138 |
| 2009/0007935 A1 | * | 1/2009 | Newman | B44D 3/16 134/201 |
| 2010/0071292 A1 | * | 3/2010 | Futterman | E04F 13/042 52/412 |
| 2012/0090265 A1 | * | 4/2012 | Mccarville | B29C 66/496 52/745.19 |
| 2012/0183724 A1 | * | 7/2012 | Ros | B32B 3/28 428/116 |
| 2012/0222215 A1 | * | 9/2012 | Chang | A47C 19/005 29/525.08 |
| 2014/0023833 A1 | * | 1/2014 | Futterman | B32B 7/12 428/190 |
| 2014/0044914 A1 | * | 2/2014 | Kurtz | B32B 38/0012 428/74 |
| 2016/0076179 A1 | * | 3/2016 | Witte | B32B 5/022 428/116 |
| 2020/0102063 A1 | * | 4/2020 | Jerry Koh | B64C 1/18 |

* cited by examiner

MOISTURE POROUS BUILDING FURRING STRIP

CROSS-REFERENCE TO RELATED APPLICATION

This application claims the benefit of the filing date of U.S. Provisional App. No. 63/322,289, filed on Mar. 22, 2022, entitled "BULK WATER RAIN, CONDENSATION, MOISTURE FURRING STRIP".

BACKGROUND OF THE INVENTION

The present invention relates to building exterior wall and roof structures, and more particularly to furring strips which typically are slender, long strips of wood. Furring strips may be use on internal building walls to level or raise the surface of another material, such as concrete, to create spacing for air movement to prevent dampness, to make space for insulation or to resurface walls with a more aesthetic material.

On the outside of a building, the furring strips are generally anchored vertically to the interior wall studs on top of the weather resistant barrier with exterior cladding placed over the furring strips to finish the exterior wall. This arrangement creates an airspace open to the outside elements at the top and bottom of the cladding for air to pass upwardly and outwardly from the bottom of the wall to the top of the wall to carrier away any moisture, condensation, dampness, vapor or water that otherwise might accumulate in the wall which could cause rotting of the wall materials and moisture leakage into the interior spaces of the exterior wall by way of screw or nail holes created when fastening the furring strips and cladding through the interior vapor barrier and into the interior wall studs.

Furring systems for treating rainwater and moisture in buildings are known. For example, U.S. Pat. No. 8,336,273 to Enns discloses a bulk water furring strip for buildings. The bulk water furring strips include vertically aligned hat-like channels anchored to the wall studs with bolts screws. The hat channels function as vertical gutters for any water that may migrate behind exterior cladding or panels.

Further, U.S. Pat. No. 9,915,073 to Hood discloses an apparatus and method for siding a building wherein the apparatus comprises an elongate planar member extending between first and second edges, top and bottom edges and having front and rear surfaces and at least one mounting block extending between first and second edges, top and bottom edges and having a rear surface wherein the at least one mounting block extends from the rear surface of the elongate planar member proximate to the top edge of the elongate planar member. The method comprises aligning each of the mounting blocks of the siding panel with a stud location in a vertical wall and fastening the siding panel to the studs in the vertical wall through the mounting blocks with a plurality of fasteners so as to create a rainscreen gap between the elongate planar member and the vertical wall.

Still further, U.S. Pat. No. 9,458,624 to Colyn discloses an elongated clip for hard clapboard style siding such as fiber cement, composite wood, fiberglass, plastic, oriented strand board or other materials. The clip includes rainscreen and standoff features for proper placement from a support wall structure. In addition, the clip includes a support feature for the installation and proper alignment of an upper course of siding.

These prior art patents fail to describe a bulk water furring strip which is easy to use and install. Further, these patents fail to provide for furring strips which adequately protect the walls of a building or house. These references fail to keep out insects and rodents from getting inside the wall structure within the air space to eventually multiply, spread and do damage to the interior of the exterior wall structure. These prior art patents fail to describe furring strips which are easy to use and install.

There is a need for rigid, plastic furring strips or rain strips that will not degrade over time, that are moisture and air porous to allow air to circulate therearound from the bottom to the top of the exterior wall structure and will prevent insects and rodents from getting inside the wall structure within the air space to eventually multiply, spread and do damage to the interior of the exterior wall structure. Such needed furring strips should eliminate the destruction caused by the numerous nails in attaching other standard furring strips by having a self-sealing adhesive layer as to seal around nails, screws or other attachment means. Any damage caused by any holes created by nails or fasteners in the attachment of the present system should further be eliminated by the self-sealing butyl-like adhesive layer filling in the holes when a nail, screw or fastener is removed.

SUMMARY OF THE INVENTION

A rigid moisture and air porous building furring strip for building walls and certain roof structures has an elongate outer facer sheet and an elongate inner facer sheet with an outer face. An open cellular core is sealed to and between the facer sheets that is porous to both air and moisture. A soft self-sealing butyl-like adhesive layer is optionally on the outer face of the inner face sheet for attachment of the furring strip to the outside of the build and underneath exterior cladding.

A principal objective and advantage of the present water furring strip includes a self-sealing adhesive layer for securing the furring strip to the wall or roof of a building. The present furring strip eliminates the destruction caused by the numerous nails in attaching other standard furring strips by having a self-sealing adhesive layer as possibly the main attachment means.

Another objective and advantage of the present furring strip is that any damage caused by any holes created by nails or fasteners in the attachment of the present system is further eliminated by the self-sealing adhesive layer filling in the holes when a nail or fastener is removed.

Another objective and advantage of the furring strip is that it may have an optional stainless-steel screen layer to prevent damage caused by insects such as beetles, moths, termites, and spiders and rodents to pass through the strip gaining entry behind the cladding or siding.

Another objective and advantage of the present invention is that it may incorporate a self-adhering, high performance adhesive tape attached to the soft self-sealing adhesive Neoprene®-type layer that is attached to the furring strip for attachment to the exterior wall beneath the siding or cladding to reducing the number of holes created by securing the furring strip with its own attachment means, such as nails or screws.

Another objective and advantage of the present invention is that it may incorporate a self-adhering, high performance adhesive tape attached to the soft self-sealing adhesive Neoprene®-type layer that is attached to the furring strip for attachment to the exterior wall beneath the siding or cladding to reducing the number of holes created by securing the furring strip with its own attachment means, such as nails or screws.

Another object and advantage of the present bulk water furring strip is that the present furring strip has an adhesive layer which may be covered by paper or cloth which can hand-torn off when ready to affix the furring strip the wall structure.

Another objective and advantage of the present furring strip is that the present furring strip has a low water permeability rating, making it generally impermeable to water while still having the ability the diffuse water vapor with air circulation, preventing condensation.

Another object and advantage of the present furring strip is that has a Neoprene®-type layer that self-seals itself when a fastener is installed to secure the cladding or siding or if the fastener is later removed in the future for siding or cladding replacement.

Another object and advantage of the present furring strips is that they may be used on the steel or clay roof structures wall of a building in order to further reduce moisture accumulation. In this embodiment of use, multiple furring strips are used in different orientations. More specifically, on the same wall, at least one furring strip may allow for vertical air flow while a second furring strip may allow for horizontal airflow. These furring strips allow for air circulation as to cool the walls and roof structures.

Another object and advantage of the present furring strip is that the Neoprene®, or Neoprene®-type layer is desirable because the siding of a building will eventually need to be replaced and if nail or fastener holes created during construction of the building were not self-sealing, those holes would eventually cause water/moisture damage to the building. Because the present system uses a Neoprene® or Neoprene®-type layer, when the siding is eventually removed, those holes self-seal as a result of the Neoprene® or Neoprene®-type layer filling in the holes with protective adhesive so that the water-resistant barrier remains secure therein protecting the underlying wood, sheathing and insulation.

For a more complete understanding of the above listed objectives and advantages of the present furring strip, knowledge will be gained upon a reading of the detailed description and the drawings.

DETAILED DESCRIPTION

Figure 1:
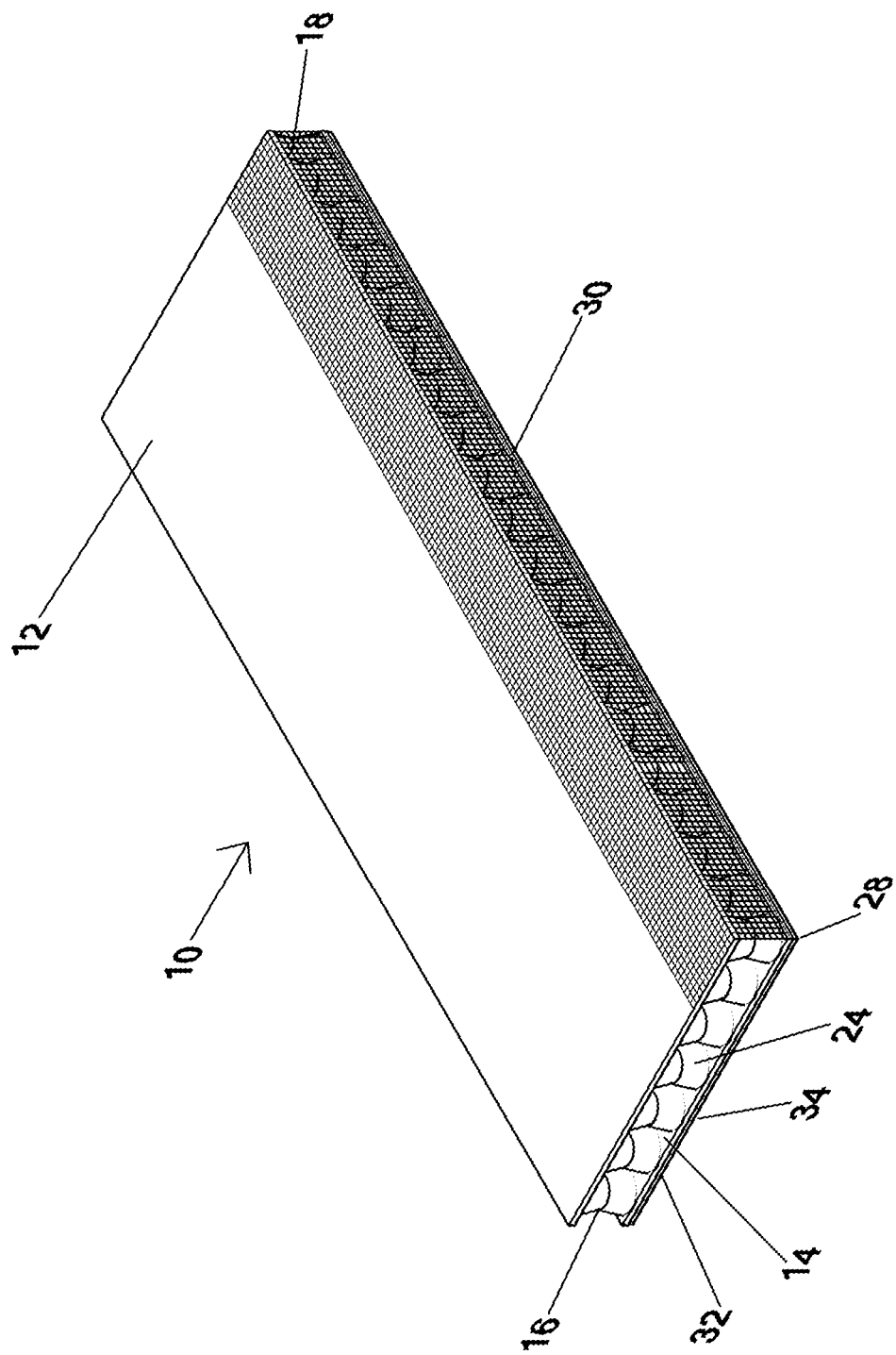
FIG. 1 is a perspective front view of the furring strip or rain strip of the present invention.
Figure 2:
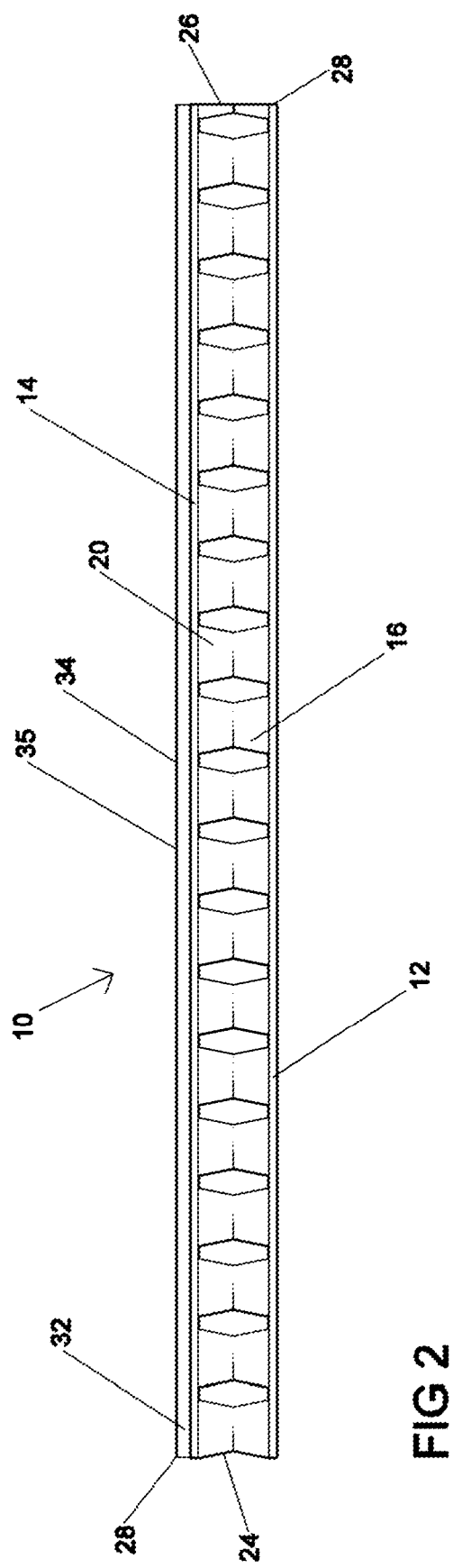
FIG. 2 is a top plan view of the furring strip showing the open top and internal open-cellular plastic core for vertical and horizontal airflow.
Figure 3:
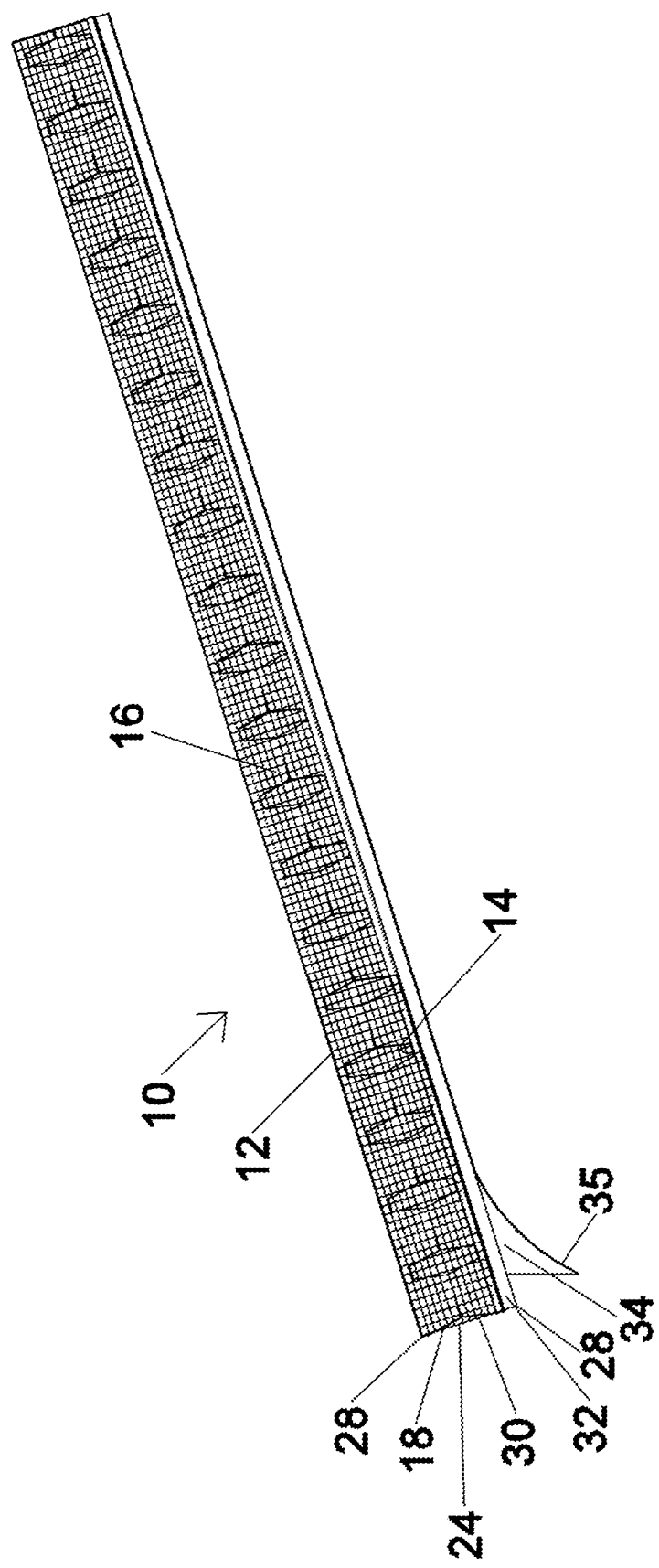
FIG. 3 is a bottom plan view of the furring strip showing the protective screen for preventing entrance of insects and rodents.
Figure 4:
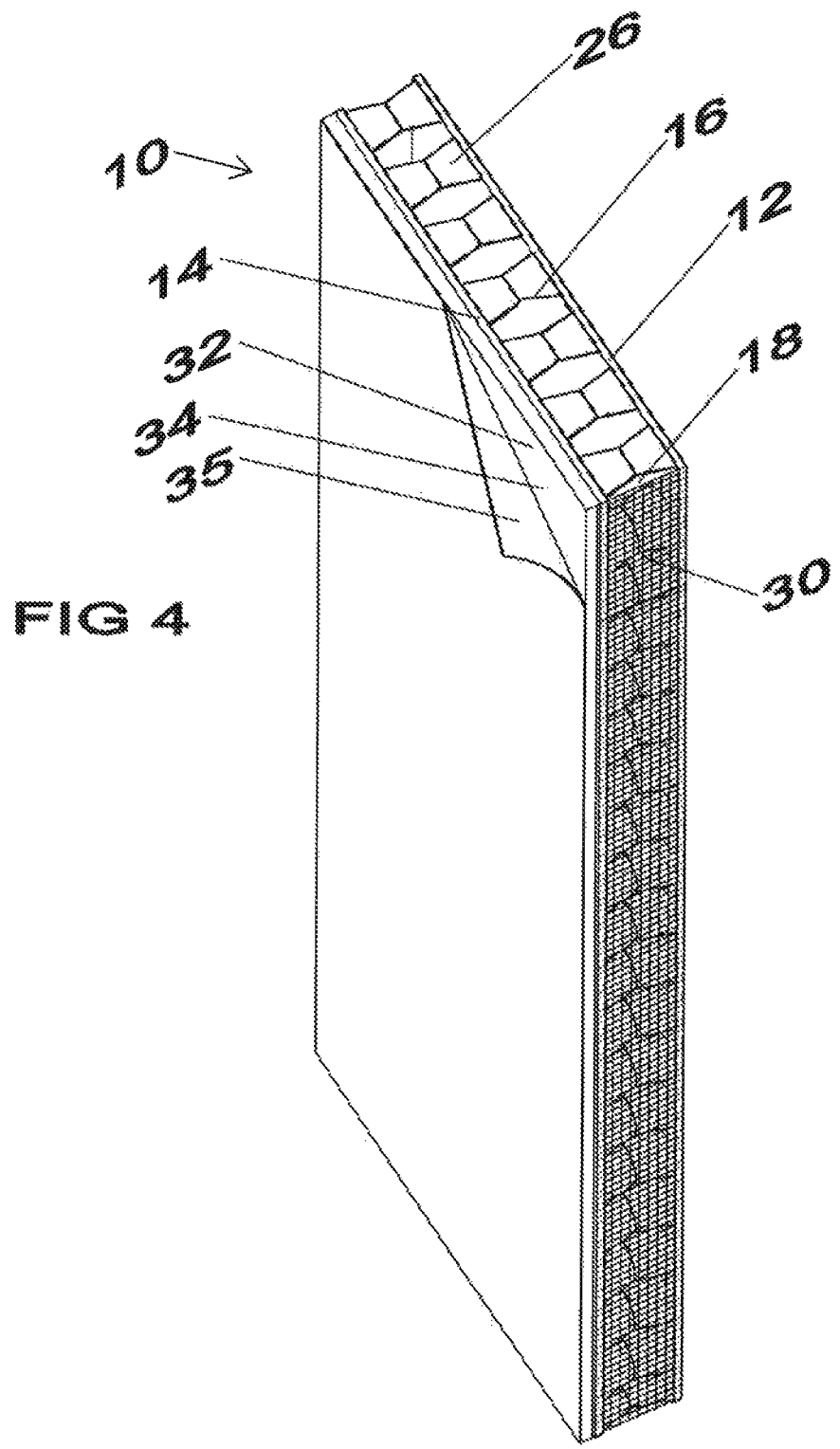
FIG. 4 is a right end view of the furring strip with the removable paper partially torn away, the left end view being a mirror image of the this right end view.

Referring to FIGS. 1-4 (and 7 and 8 showing layers), the moisture and air porous building furring strip or rain strip 10 of the present invention may be understood. The strip 10 may be sized to be approximately 2 inches wide and ½ inch thick and preferably ⅜ inch to ¾ inch thick (the distance from the front or outer facer sheet 12 to the back or inner facer sheet 14 of the strip 10). The strip 10 may be eight feet long. In construction, the strip 10 may be cut out of 4 foot by 8 foot sheets. The furring strip 10 includes an outer plastic facer sheet 12 and an inner plastic facer sheet 14 with an outer face 15.

Between and fastened to facer sheets 12 and 14 is an open-cellular plastic core 16. The plastic core is porous to all forms of water and moisture and air. The core 16 may take any structural form that is porous such as channels, slots, bubbles or honeycombed shaped.

The strip 10 may have a screen material 30 along its open bottom 18, open top 20, ends 24 or 26 that may be exposed to the environment to prevent insects and rodents from getting inside the exterior wall structure 40. The screen material 30 still advantageously allows for ingress and egress of air to keep the interior wall structure 40 dry by way of the moving air through the cavity between the interior vapor barrier 52 and the exterior cladding or siding 70. The screen material may be made of stainless steel with a 10×10 mesh.

The furring strip 10 may simply be made of a weather resistant material as plastic such as polypropylene. The screen 30 is held in place on the strip 10 by heat sealing or tape or butyl. On the outer face 15, a soft putty-like material may be applied thereto. Neoprene® 32 (polychloroprene) has been found to work well but is not limiting to other putty-like substances. Lastly, a layer of sticky mastic 34 with a peelable paper covering may be applied to the Neoprene® to protect the stickiness of the rain strip 10 until it is ready to use.

To attach the current furring strip 10 to any surface, a user removes the removable paper layer 35 from the back of the mastic layer 34. Once the adhesive is exposed, the strip 10 is applied to the surface of the weather resistant barrier 56 of the wall. Preferably, the strip 10 is then rolled with a roller to apply pressure and squish the Neoprene® and securely attach the strip 10 to the barrier 56 of the wall. When pressure is applied to the strip 10, the adhesive on the back face 15 impregnates onto the weather barrier 56, especially at the location of any prior stapler, screw or nail holes.

Figure 5:
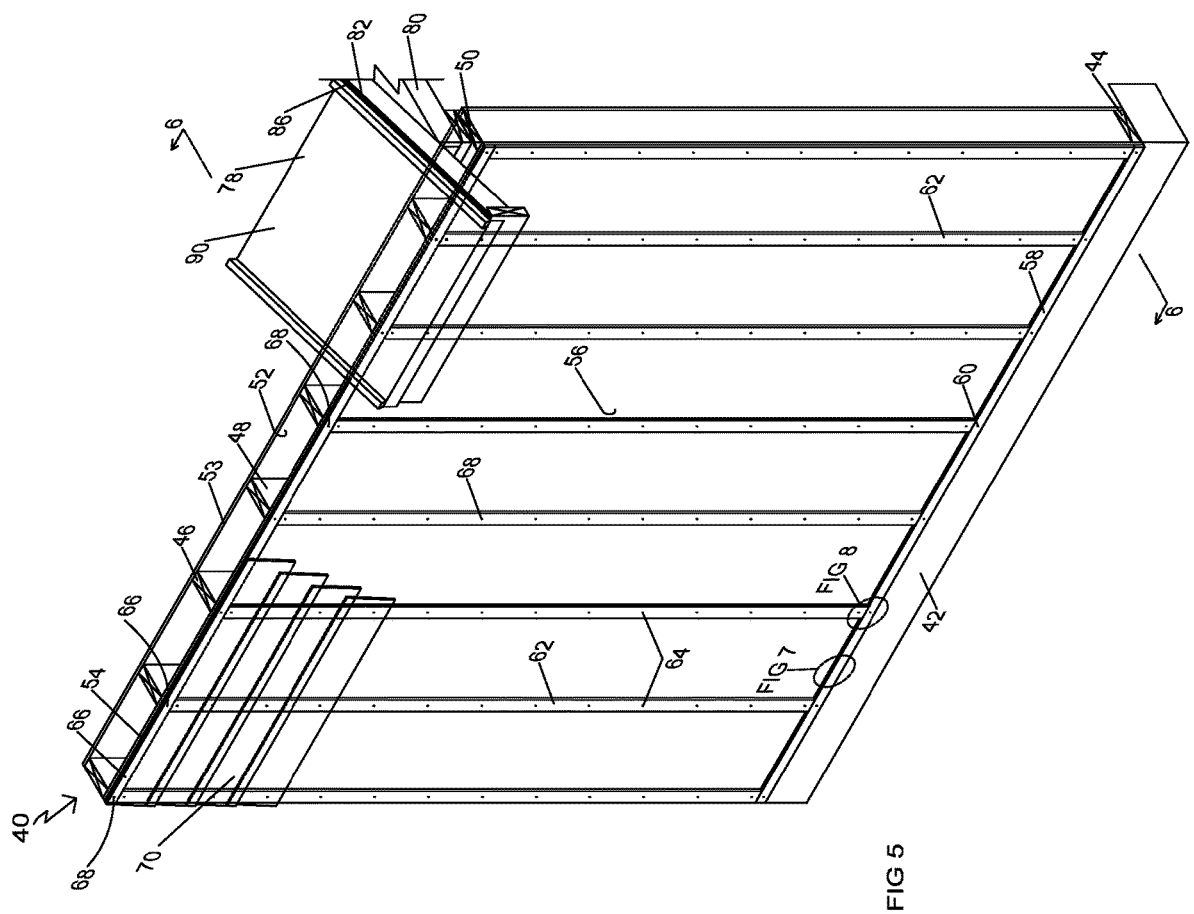
FIG. 5 is a front perspective view of wall siding and roof assemblies partially broken away and partially assembled.
Figure 6:
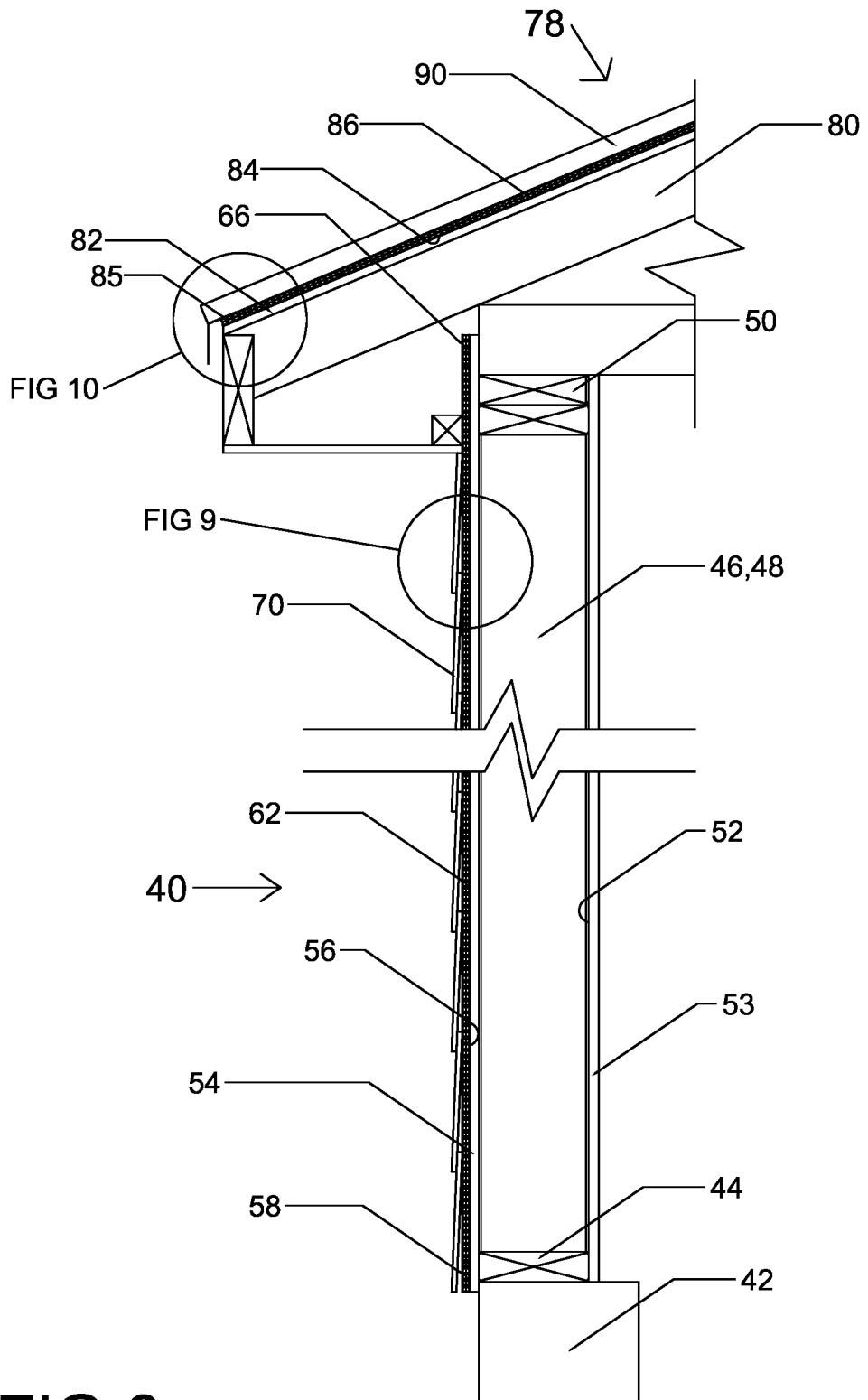
FIG. 6 is a cross sectional view taken along lines 6-6 of FIG. 5.
Figure 7:
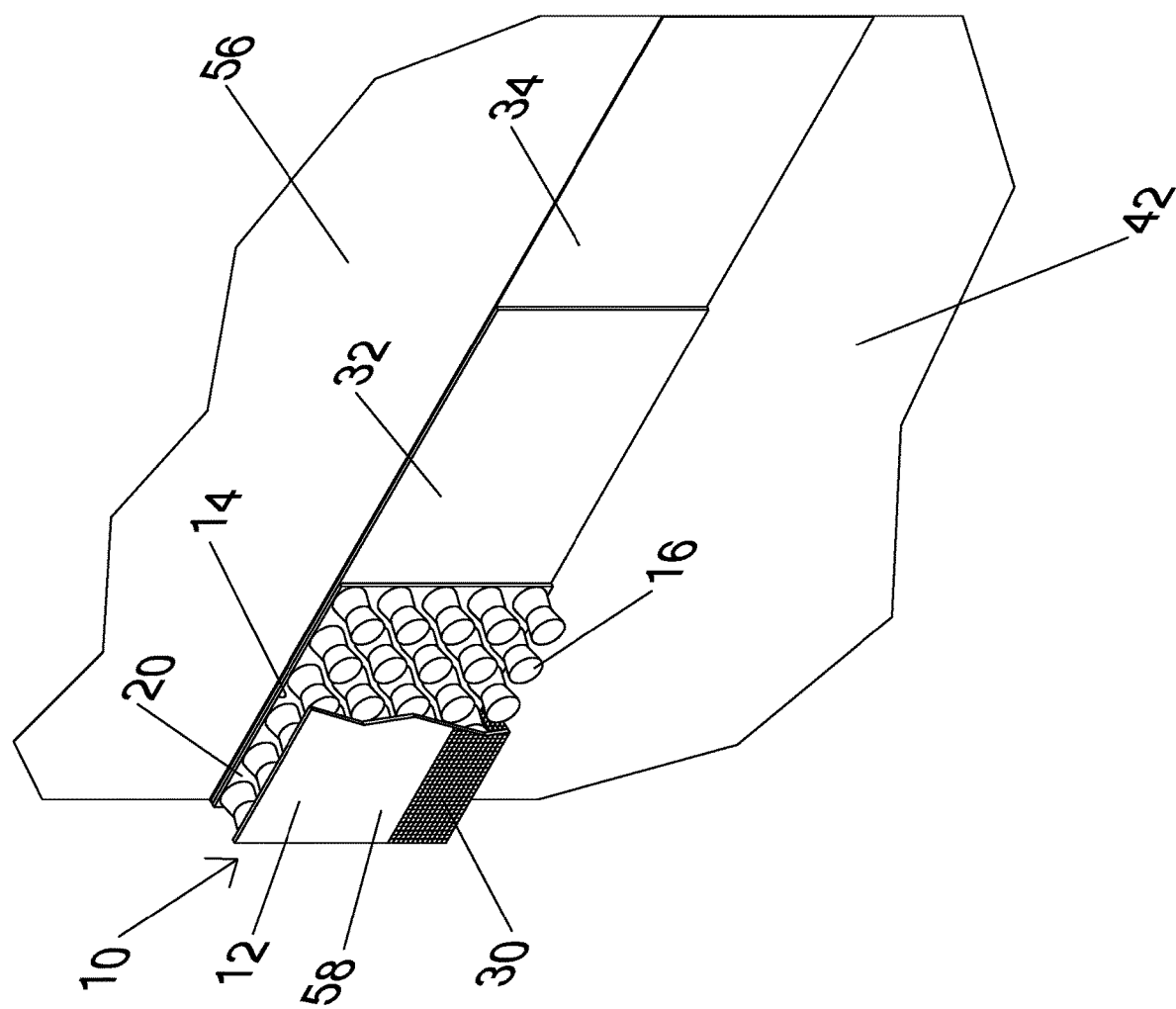
FIG. 7 is an enlarged view of the circled area marked FIG. 7 of FIG. 5 showing the layers of the furring strips.
Figure 8:
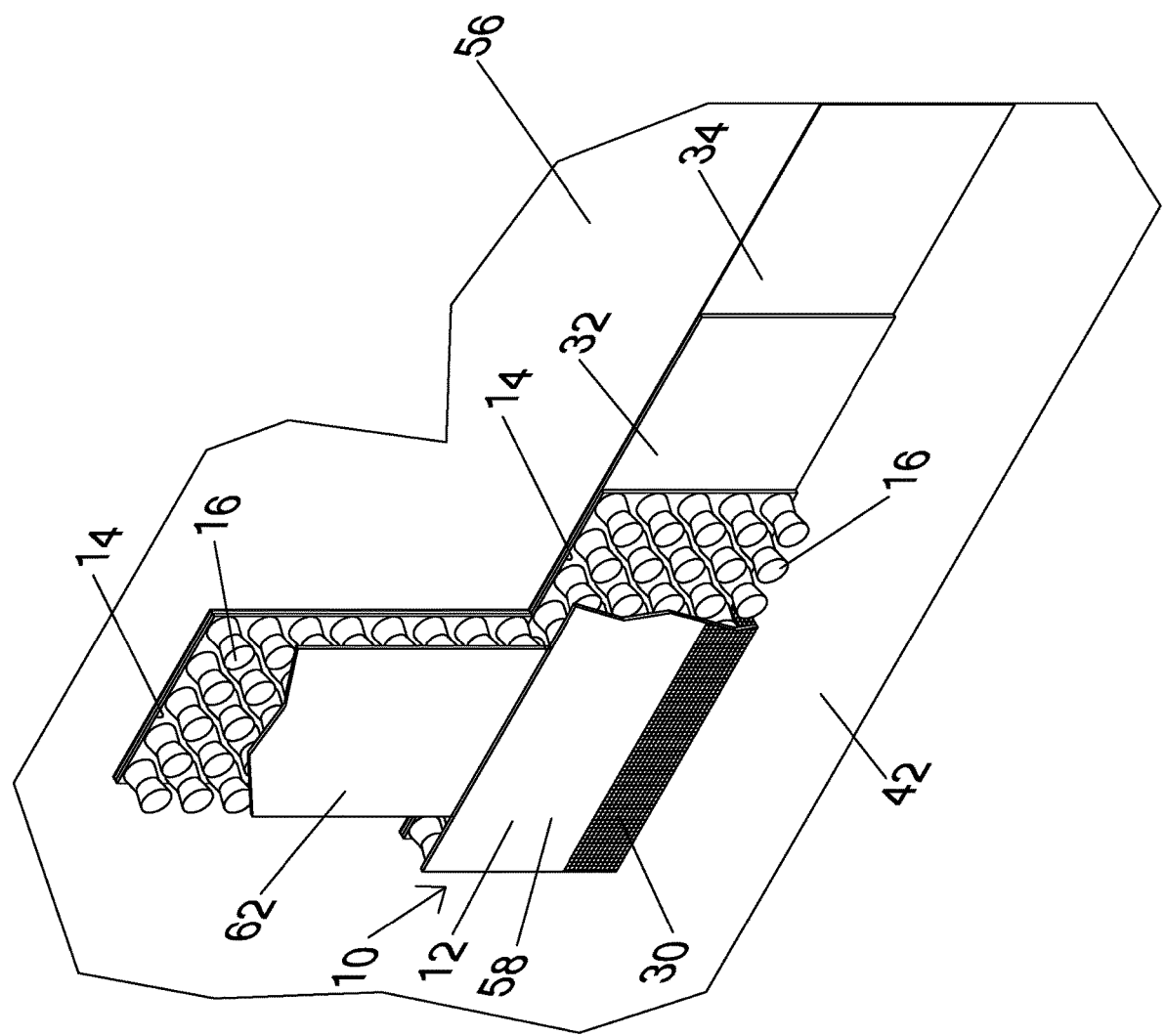
FIG. 8 is an enlarged view of the circled area marked FIG. 8 of FIG. 5 showing the layers of the furring strips.
Figure 9:
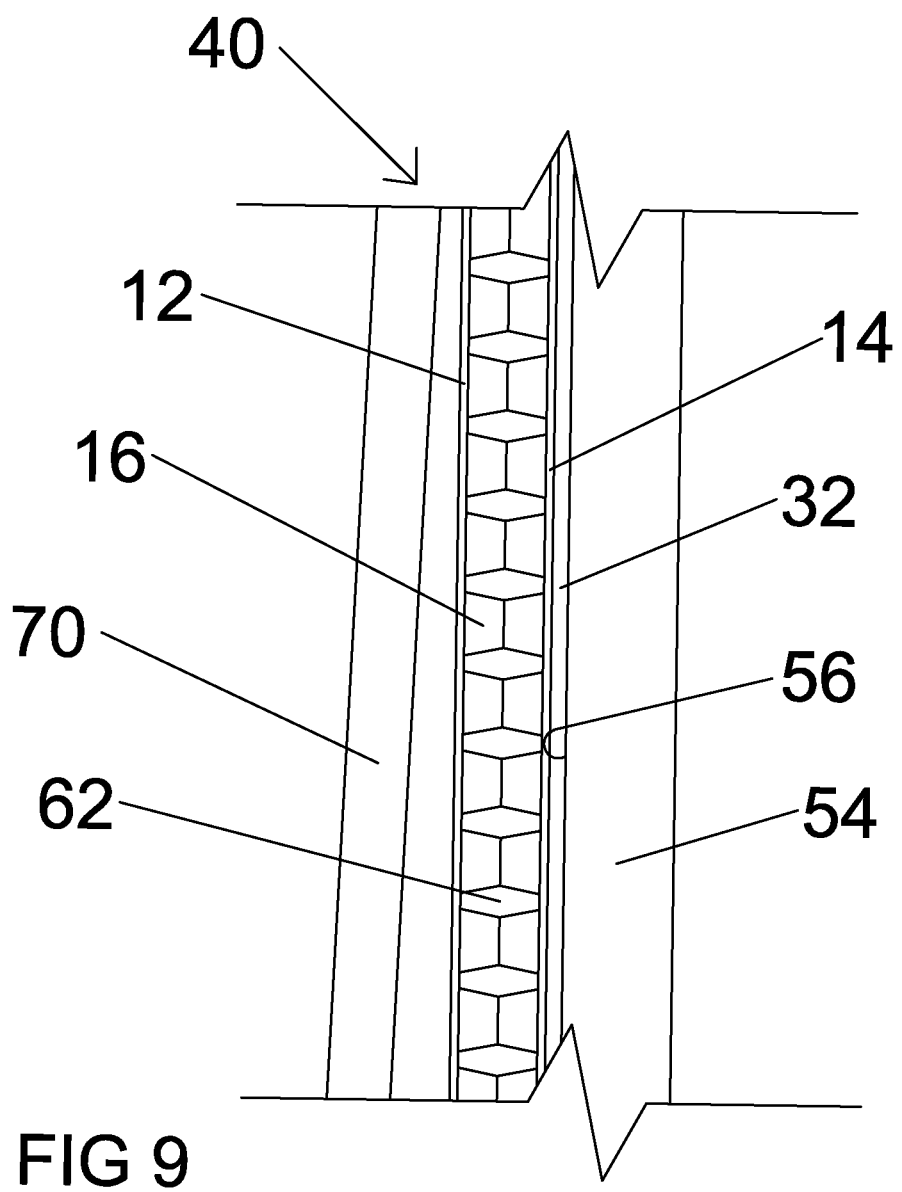
FIG. 9 is an enlarged view of the circled area marked FIG. 9 of FIG. 6.

Referring to FIGS. 5-10, details of installation, use and benefits of the furring strip or rain strip 10 may be appreciated as used in an exterior wall 40 metal roof 78 structures. More specifically, FIG. 5 shows a perspective view of a partially constructed exterior wall 40 and metal roof 78 while FIG. 6 shows a cross-sectional view of the exterior wall 40 and roof 78 structures.

The exterior wall structure 40 is typically built on a cement foundation 42. On top the foundation 42 is a wood bottom plate 44. Wall framing 46 typically consists of an array of parallel two-by-four wood studs 48 spaced sixteen inches on center. Twenty-four inches on center are also sometimes used. On top of the two-by-fours are mounted a wood top plate 50. On the interior side of the wall 40 an interior vapor barrier 52 is tacked thereto. Thereafter, sheet rock or dry wall 53 is nailed or screwed over the moisture barrier. Typically, insulation is placed into the spaces between the two-by-fours 48.

On the outside of the exterior wall structure 40, wall sheathing 54 is screwed or nailed to the outside of the two-by-fours 48. Thereafter, a weather resistant barrier 56 is tacked to the sheathing 54. At the bottom and top of the sheathing 54 and the barrier 52 horizontal bottom and top furring strips 58 and 66 are secured in place on center of the two-by-fours by screws 60 or just the soft sticky Neoprene® with or without the mastic 34 after the paper 35 has been remove. These top and bottom strips 66 and 58 may respectively have a top screen 30 and a bottom screen 30. The exposed to the environment ends 24 and 26 of these strips 66 and 58 maybe open or they may be closed with facer material 12 or 14 or screen material 30. The vertical furring strips 62 are similarly mounted to the weather barrier 56 and on center with the vertical two-by-fours 48 with or without screws or nails 64 as to butt up against the top and bottom furring strips 66 and 58. The two outside vertical furring strips 62 may have outside screens 30. By this arrangement, insects and rodents will not be permitted entrance to the space between the weather resistant barrier 56 and the cladding 70.

The cladding 70 is conventionally mounted to the furring strips 58, 62 and 66 with screws or nails driven through the rain strips 58, 62 and 66 on center into the two-by-fours 48. The space between the weather resistant barrier 56 and the cladding 70 is now open to air movement and though the furring strips 58, 62 and 66 both horizontally and vertically typically from bottom to top through natural convection. Also, insects and rodents cannot get into this space. Moisture cannot get into the interior of the exterior wall structure 40 as the Neoprene® seals up holes around the existing nails that pass through the furring strips 58, 62 and 66.

With time, the exterior cladding or siding 70 may need to be replaced. Once the mounting nails or screws are withdrawn, the remaining holes are sealed up by the soft putty-like self-sealing material against the weather resistant layer 56. New cladding is simply mounted to the furring strips 58, 62 and 66 with nails or screws passing therethrough the strips 10 and into the two-by-fours 48 where under the strips 10 a seal is again made around the nails or screws.

Figure 10:
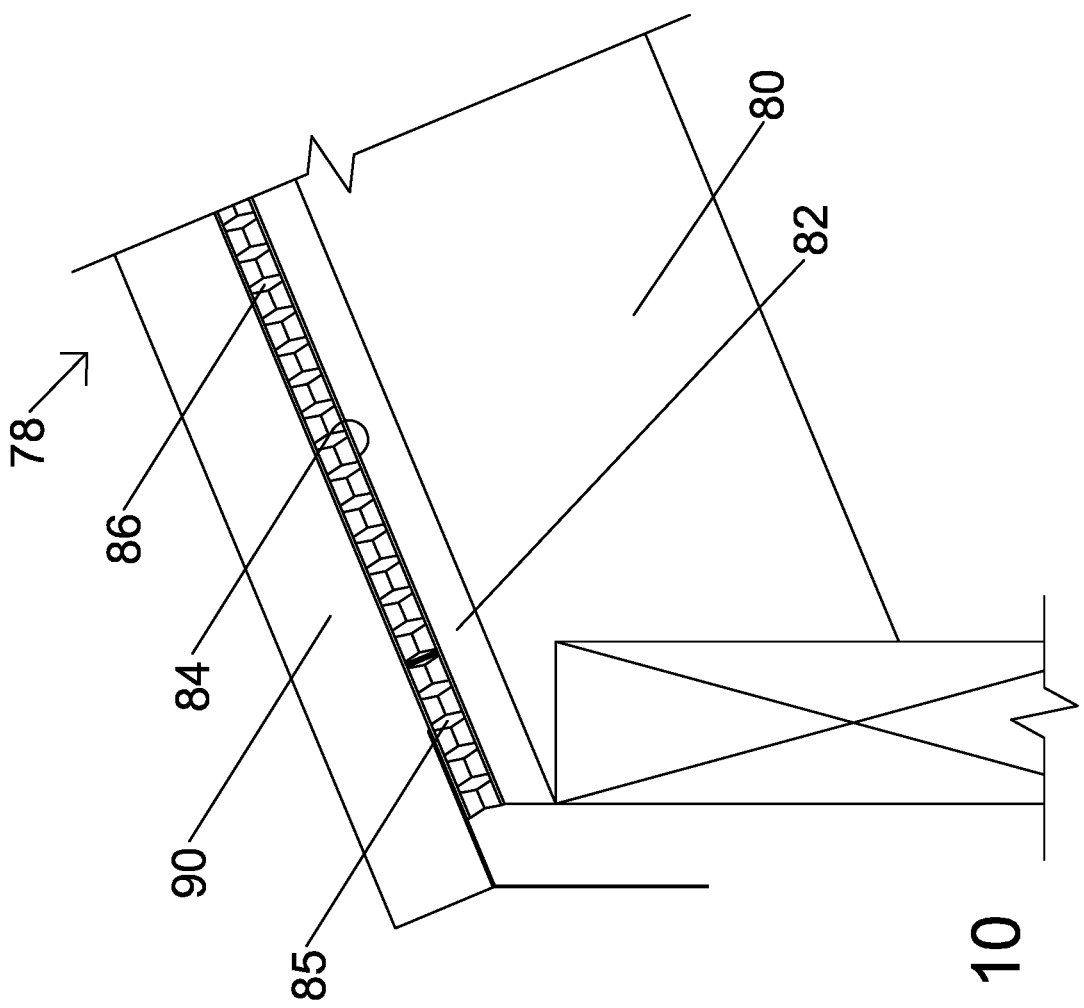
FIG. 10 is an enlarged view of the circled area marked FIG. 10 of FIG. 6.

Metal or clay roof structures 78 may be seen in FIGS. 5, 6 and 10. Trusses 80 are installed and secured on top the frame building. Sheathing 82 is installed on top of the trusses with nails or screws set into the trusses 80. Thereafter, weather resistant roof underlayment 84 is placed over the sheathing 82. Vertical and horizontal furring strips 85 and 86 are similarly, as in the wall structure 40, mounted to the roof underlayment 84 and where possible on center with the trusses 80 with the Neoprene® adhesively secured to the roof underlayment 84 with or without screws or nails.

Thereafter, the metal roof sheets or panels 90 or clay tiles are mounted to the horizontal and vertical furring strips 85 and 86 with nails or screws passing through the furring strips and being sealed therearound by the Neoprene®. Here again, the air may pass through the furring strips from the base of the strips 85 and 86 to the top of the strips 85 and 86 and wick out any moisture and also have a tendency to cool the metal roof 78 from the hot sun. Replacement of the metal or clay roof 78 is simply done by removing the existing metal roof 78 and installing a new metal roof 78 to the furring strips 85 and 86. The furring strips 85 and 86 will seal the previous fastener holes and around the new fastener means.

Although embodiments of the invention are shown and described herein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A rigid moisture and air porous building furring strip for building walls and metal roofs, comprising:
    a.) a plastic elongate outer facer sheet;
    b.) a plastic elongate inner facer sheet with an outer face;
    c.) a plastic open cellular core sealed to and between the facer sheets that is porous to both air and moisture;
    d.) a self-sealing adhesive layer on the outer face of the inner facer sheet;
    e.) a screen material extending from at least one side of the outer facer sheet to an adjacent side of the inner facer sheet to prevent insects, such as beetles, moths, terminates and spiders, and rodents to pass through the core; and
    f.) a peelable protective sheet covering the self-sealing adhesive.

2. The furring strip of claim 1, wherein the plastic is polypropylene.

3. The furring strip of claim 1, wherein said screen material is stainless steel.

4. The furring strip of claim 1, wherein the self-sealing adhesive layer is chosen from a group of polychloroprene, self-sealing adhesive and butyl.

5. The furring strip of claim 1, wherein the furring strip is 2 inches wide and ⅜ inch to ¾ inch thick.

* * * * *